(12) United States Patent
Noguchi et al.

(10) Patent No.: US 8,714,332 B2
(45) Date of Patent: May 6, 2014

(54) POWER TRANSMITTING DEVICE

(75) Inventors: Hitoshi Noguchi, Chiryu (JP); Hiroshi Okada, Kariya (JP); Hiroyuki Usami, Kariya (JP); Yoshihiro Yamashita, Anjo (JP)

(73) Assignee: Denso Corporation, Kariya (JP)

( * ) Notice: Subject to any disclaimer, the term of this patent is extended or adjusted under 35 U.S.C. 154(b) by 257 days.

(21) Appl. No.: 13/442,136

(22) Filed: Apr. 9, 2012

(65) Prior Publication Data

US 2012/0292153 A1  Nov. 22, 2012

(30) Foreign Application Priority Data

May 16, 2011 (JP) .................................. 2011-109445

(51) Int. Cl.
  *B60K 6/387* (2007.10)
  *B60K 6/48* (2007.10)
  *F16D 25/0638* (2006.01)
  *F16D 25/12* (2006.01)

(52) U.S. Cl.
  USPC ..................... 192/85.61; 180/65.25; 903/914; 310/78

(58) Field of Classification Search
  CPC .............................................. F16H 2061/0046
  USPC ...................................................... 192/85.61
  See application file for complete search history.

(56) References Cited

U.S. PATENT DOCUMENTS

| 7,114,604 B2 * | 10/2006 | Masuya ....................... 192/3.29 |
| 2010/0109461 A1 | 5/2010 | Kato et al. |
| 2011/0301796 A1 * | 12/2011 | Ohashi et al. .................... 701/22 |
| 2012/0032538 A1 * | 2/2012 | Kasuya et al. ................... 310/54 |

FOREIGN PATENT DOCUMENTS

| JP | 2003-48438 | 2/2003 |
| JP | 2006-15997 | 1/2006 |

OTHER PUBLICATIONS

Office Action (2 pages) dated Jan. 22, 2013 issued in corresponding Japanese Application No. 2011-109445 and English translation (4 pages).

* cited by examiner

*Primary Examiner* — Richard M. Lorence
(74) *Attorney, Agent, or Firm* — Nixon & Vanderhye PC

(57) ABSTRACT

A main shaft has a shaft cylindrical portion extending from an outer periphery of a large-diameter portion. A drum has a drum cylindrical portion extending from an outer periphery of a drum plate portion. An axial forward end of the drum cylindrical portion is arranged in an inside of the shaft cylindrical portion. A frictional engagement unit of a clutch is provided in an inside of the shaft cylindrical portion. A motor generator has a rotor, which is firmly fitted to outer walls of the large-diameter portion and the shaft cylindrical portion and rotatable relative to a stator. A working-oil supply passage is formed in an inside of an input shaft.

7 Claims, 3 Drawing Sheets

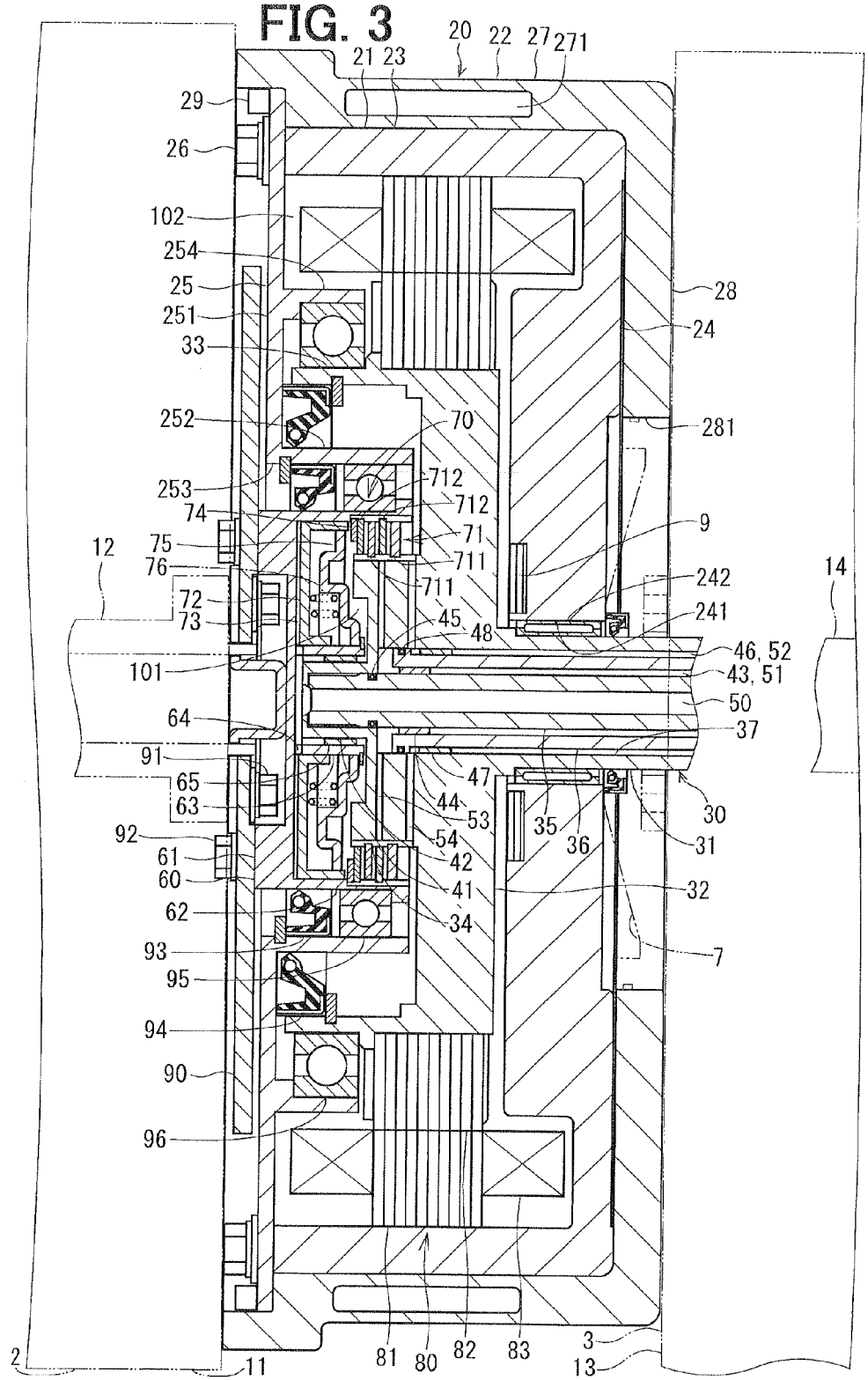

POWER TRANSMITTING DEVICE

CROSS REFERENCE TO RELATED APPLICATION

This application is based on Japanese Patent Application No. 2011-109445 filed on May 16, 2011, the disclosure of which is incorporated herein by reference.

TECHNICAL FIELD

The present disclosure relates to a power transmitting device for transmitting driving force of an engine to a transmission apparatus of a vehicle, in particular to a power transmitting device having a clutch and a motor generator.

BACKGROUND

A power transmitting device for a hybrid vehicle is known in the art, according to which a driving force of an engine or a rotational force of a motor generator is operatively transmitted to a transmission apparatus of a vehicle by operating a clutch. According to the power transmitting device, for example, as disclosed in Japanese Patent Publication No. 2006-15997, a frictional engagement unit of a clutch is arranged between an inner wall of a main shaft (which is fitted to a rotor of a motor generator) and an outer wall of a drum (which is connected to an output axis of an engine). A pushing member is provided at the frictional engagement unit on a side to a transmission apparatus, while a working-oil chamber is formed at the pushing member on a side opposite to the frictional engagement unit. When working oil is supplied to the working-oil chamber via a working-oil supply passage formed in the main shaft, oil pressure in the working-oil chamber is increased, the pushing member is pushed against the frictional engagement unit. Then, the frictional engagement unit is brought into a clutch engaged condition, to thereby couple the output axis of the engine to an input axis of the transmission apparatus. When coupling and de-coupling between the output axis of the engine and the input axis of the transmission apparatus are repeatedly carried out, the engagement and dis-engagement of the frictional engagement unit is repeatedly carried out. Therefore, heat is generated in the frictional engagement unit, during the frictional engagement unit is maintained in its clutch engaged condition.

According to the power transmitting device of the above prior art (JP No. 2006-15997), it may be possible to form a cooling-oil passage in the main shaft so as to supply cooling oil to a position close to the frictional engagement unit via the cooling-oil supply passage, to thereby cool the frictional engagement unit. It is, thereby, possible to control heat loss of the frictional engagement unit. According to the prior art (JP No. 2006-15997), one side of the frictional engagement unit opposite to the pushing member is connected to a space, in which the motor generator is arranged (hereinafter, an MG accommodating space). Accordingly, cooling oil for cooling the frictional engagement unit or working oil for operating the frictional engagement unit may enter the MG accommodating space, and thereby the cooling oil or the working oil may be adhered to the motor generator and thereby the motor generator may be defaced. When extraneous material (for example, friction powder) is mixed into the cooling oil or the working oil, which may be adhered to the motor generator, such extraneous material may flow into a gap between a stator and a rotor of the motor generator, and thereby a problem of malfunction may be caused.

According to another prior art, for example, as disclosed in Japanese Patent Publication No. 2003-48438, a clutch casing is provided at a drum, which is connected to an output axis of an engine, on a side to a transmission apparatus, and a clutch (including a pushing member and a frictional engagement unit) is accommodated in a space formed between the clutch casing and the drum. According to such a structure, it is prevented or suppressed that working oil for operating the clutch or cooling oil for cooling the frictional engagement unit may leak out from a clutch accommodating space and such oil may be adhered to a motor generator. According to the power transmitting device of the prior art (JP No. 2003-48438), however, the clutch casing is necessary to form the clutch accommodating space together with the drum. A possible increase of number of parts and components may be a problem. According to the power transmitting device of the prior art (JP No. 2003-48438), the drum, since the clutch and the clutch casing are arranged in the axial direction of the motor generator on the side to the transmission apparatus, a size of the power transmitting device ma become larger in the axial direction.

SUMMARY OF THE DISCLOSURE

The present disclosure is made in view of the above points. It is an object of the present disclosure to provide a small-sized power transmitting device which can effectively cool a clutch with a small number of parts and components and according to which it is possible to prevent a motor generator from being defaced.

According to a feature of the present disclosure (for example, as defined in the appended claim 1), a power transmitting device for transmitting driving force of an engine to a transmission apparatus of a vehicle has a housing; a main shaft; a drum; a clutch; and a motor generator.

The housing has; a cylindrical housing main body; a rear housing having a first opening portion at a center thereof and closing a first axial end of the housing main body on a transmission side; and a front housing having a second opening portion at a center thereof and closing a second axial end of the housing main body on an engine side.

The main shaft has; a shaft portion, which is to be connected to an input axis of the transmission apparatus, inserted through the first opening portion and rotatably supported by the rear housing; a large-diameter portion having a larger diameter than that of the shaft portion and formed at an axial end of the shaft portion on a side opposite to the transmission apparatus; and a shaft cylindrical portion formed in a cylindrical shape and extending from an outer periphery of the large-diameter portion in a direction opposite to the shaft portion.

The drum has; a drum plate portion formed in an inside of the second opening portion and to be connected to an output axis of the engine; and a drum cylindrical portion formed in a cylindrical shape and extending from an outer periphery of the drum plate portion in a direction opposite to the engine, wherein an axial forward end of the drum cylindrical portion is arranged in an inside of the shaft cylindrical portion.

The clutch has; a frictional engagement unit having a first and a second friction plate and respectively connected to the drum cylindrical portion and to the main shaft; a pushing member for bringing the frictional engagement unit into a clutch-engaged condition when the pushing member is pushed toward the frictional engagement unit; and a working-oil chamber formed at an axial end of the pushing member on a side opposite to the frictional engagement unit, wherein the output axis is coupled to the input axis when the first and second friction plates are engaged with each other.

The motor generator has; a stator of an annular shape, an outer wall of which is fixed to an inner wall of the housing; and a rotor of an annular shape, an inner wall of which is firmly fitted to outer walls of the large-diameter portion and the shaft cylindrical portion, so that the rotor is rotatable in an inside of the stator relative to the stator.

The main shaft has; a working-oil supply passage communicated to the working-oil chamber; and a cooling-oil supply passage and a cooling-oil discharge passage, both of which are communicated to a space formed in the inside of the shaft cylindrical portion.

A gap between the drum and the front housing as well as a gap between the front housing and the shaft cylindrical portion is fluid-tightly sealed.

According to the above feature, when the working oil is supplied into the working-oil chamber via the working-oil supply passage, the oil pressure in the working-oil chamber is increased so that the pushing member is pushed against the frictional engagement unit. As a result, the frictional engagement unit is brought into the clutch engaged condition, so that the output axis of the engine is coupled to the input axis of the transmission apparatus.

When the coupling and de-coupling between the output axis of the engine and the input axis of the transmission apparatus are repeatedly carried out, the engagement and dis-engagement of the frictional engagement unit is repeatedly carried out. As a result, heat is generated in the frictional engagement unit when it is in the engaged condition. According to the present disclosure, the cooling oil is supplied into the space inside of the shaft cylindrical portion via the cooling-oil supply passage, so as to cool down the frictional engagement unit of the clutch accommodated in the above space.

The cooling oil having cooled down the frictional engagement unit is discharged to the outside of the power transmitting device via the cooling-oil discharge passage. According to the present disclosure, since the cooling oil is circulated around the frictional engagement unit via the cooling-oil supply passage and the cooling-oil discharge passage, the frictional engagement unit can be effectively cooled down. Furthermore, it is possible to effectively reduce heat loss in the frictional engagement unit.

According to the present disclosure, the clutch is accommodated in the clutch accommodating space, which is surrounded by the large-diameter portion of the main shaft, the inner wall of the shaft cylindrical portion, the front housing and the drum. On the other hand, the motor generator is accommodated in the MG accommodating space, which is surrounded by the outer wall of the shaft cylindrical portion of the main shaft, the inner wall of the housing main body, the front housing and the rear housing. The clutch accommodating space is arranged in the inside of the MG accommodating space, and the clutch accommodating space and the MG accommodating space are separated by the shaft cylindrical portion.

The space between the drum and the front housing and the space between the front housing and the shaft cylindrical portion are respectively sealed fluid-tightly from the outside of the power transmitting device. In other words, the clutch accommodating space is fluid-tightly sealed from the outside thereof. It is, therefore, possible to prevent and/or suppress that the working oil or the cooling oil may be leaked out from the clutch accommodating space.

Namely, it is possible to prevent and/or suppress that the working oil or the cooling oil may be adhered to the engine or may flow into the MG accommodating space. In addition, it is possible to prevent and/or suppress that the working oil or the cooling oil may be adhered to the motor generator and thereby the motor generator may be disfeatured. As a result, it is possible to suppress malfunction of the motor generator, which may be caused by the working oil or the cooling oil in which extraneous material are mixed.

As above, the clutch accommodating space is formed by the drum, the front housing and the main shaft, which correspond to those parts and components of the power transmitting device of the prior art. In addition, the outside and inside of the clutch accommodating space are fluid-tightly sealed from each other, so as to prevent or suppress the defacement of the motor generator. In other words, according to the present disclosure, the defacement of the motor generator can be avoided without increasing the number of the parts and components for the clutch accommodating space.

The rotor of the motor generator is fitted to the outer wall of the shaft cylindrical portion. An axial forward end of the drum cylindrical portion on the side opposite to the drum plate portion is arranged in the inside of the shaft cylindrical portion. The frictional engagement unit of the clutch is provided in the inside of the shaft cylindrical portion, so that the frictional engagement unit is connected to the drum cylindrical portion and the main shaft. In other words, at least a portion of the clutch in the axial direction is arranged in the inside of the rotor. According to such a structure, a part of the clutch and a part of the motor generator are overlapped in the axial direction, so that the power transmitting device can be reduced in its size.

BRIEF DESCRIPTION OF THE DRAWINGS

The above and other objects, features and advantages of the present disclosure will become more apparent from the following detailed description made with reference to the accompanying drawings. In the drawings:

FIG. 3 is a schematic cross sectional view showing a power transmitting device according to a second embodiment of the present disclosure.

DETAILED DESCRIPTION OF THE EMBODIMENTS

Figure 1:
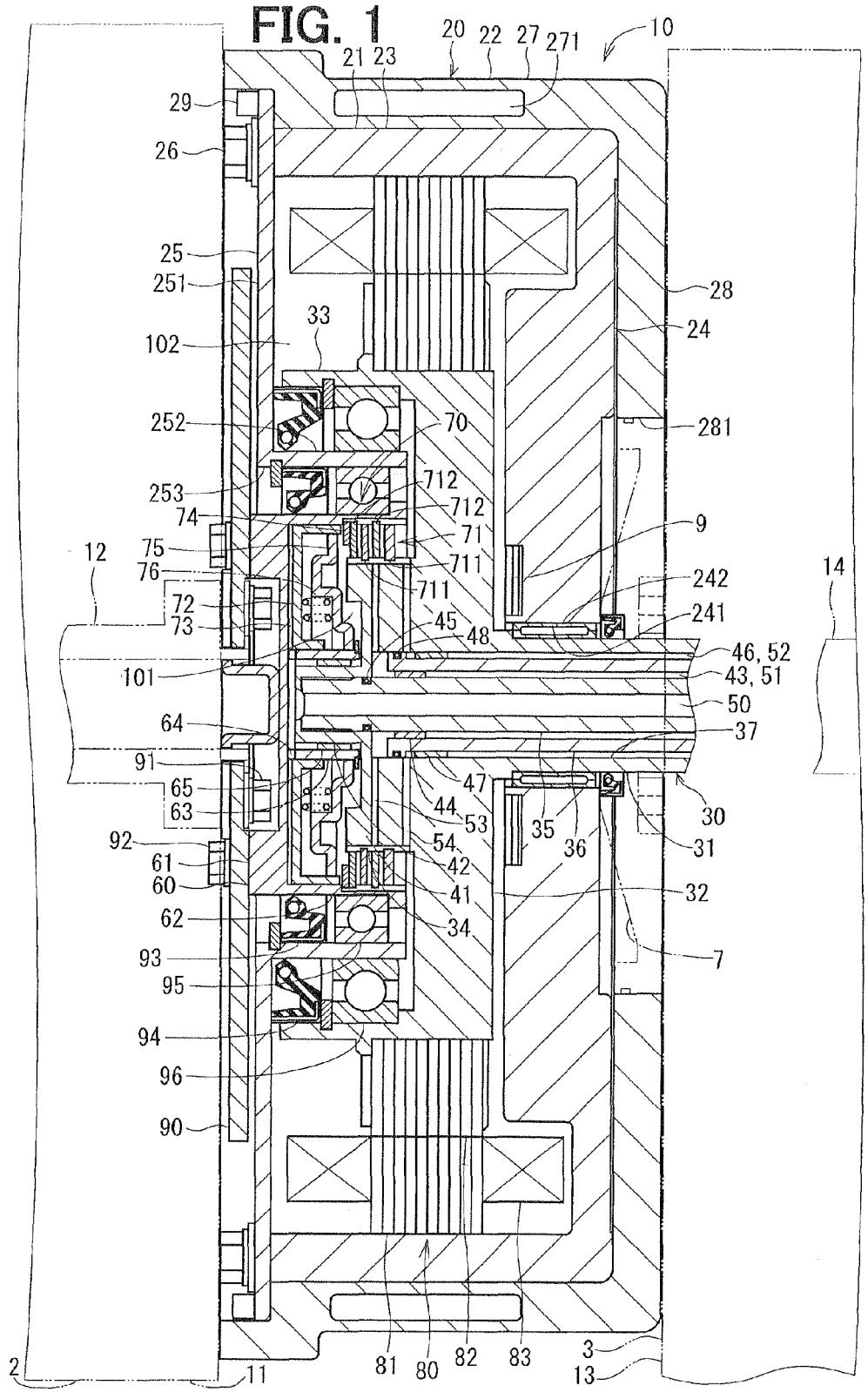
FIG. 1 is a schematic cross sectional view showing a power transmitting device according to a first embodiment of the present disclosure.

A power transmitting device of the present disclosure will be explained by way of multiple embodiments with reference to the drawings. The same reference numerals are used throughout the embodiments for the purpose of designating the same or similar parts and/or components.

First Embodiment

A power transmitting device of a first embodiment of the present disclosure as well as an example of its application will be explained with reference to FIGS. 1 and 2.

Figure 2:
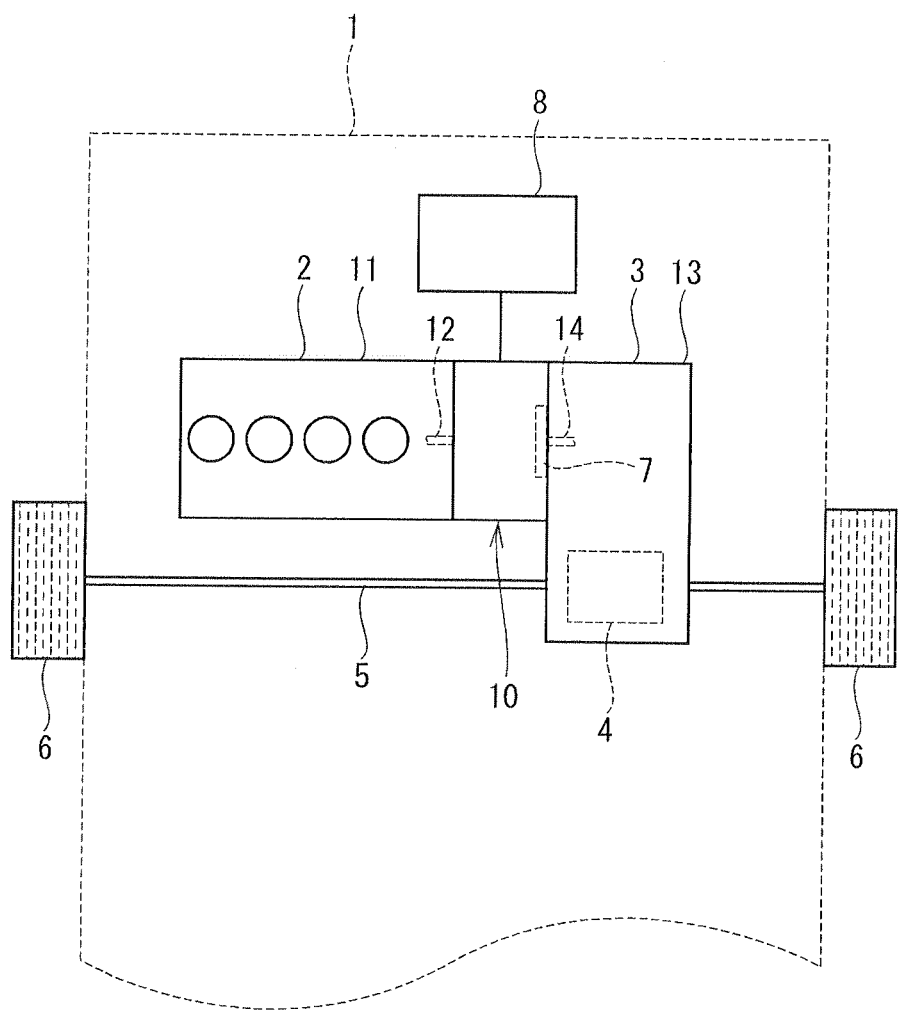
FIG. 2 is a schematic view showing apart of a vehicle, in which the power transmitting device of the above first embodiment is mounted.

As shown in FIG. 2, the power transmitting device 10 is arranged between an internal combustion engine 2 of a vehicle 1 and a transmission apparatus 3. The power transmitting device 10 transmits driving force outputted from the engine 2 (operating as a first source for the driving force) to the transmission apparatus 3. The driving force transmitted to the transmission apparatus 3 is further transmitted to an axle 5 via a differential gear 4, wherein speed is decreased or increased by a gear shifting mechanism of the transmission apparatus 3. As a result, vehicle wheels 6 are driven to rotate so that the vehicle 1 travels.

According to the present embodiment, the engine 2 is mounted on a front side of the vehicle 1 to drive the front wheels 6. In other words, the vehicle 1 is of a front-wheel driven type. The transmission apparatus 3 is a continuous variable transmission (CVT) apparatus. A gearless drive mechanism of the transmission apparatus 3 is operated by working oil supplied from a pump 7.

The power transmitting device 10 has a motor generator 80, which will be operated as a second source for the driving force. When driving force (that is, rotational force) of the motor generator 80 is transmitted to the transmission apparatus 3, it becomes possible for the vehicle 1 to run by the driving force from the motor generator 80. It is further possible to use the driving force of the motor generator 80 as an assisting force, when the vehicle 1 is running by the driving force from the engine 2.

According to the present embodiment, rotational force of the vehicle wheels 6 is transmitted to the motor generator 80 via the axle 5, the differential gear 4 and the transmission apparatus 3, so that it is possible to operate the motor generator 80 as an electric power generator. Namely, the motor generator 80 generates electric power by controlling regenerative braking energy. The electric power generated by the motor generator 80 is charged in a battery 8, so that such charged energy will be utilized for driving the motor generator 80 and operating other apparatuses and devices of the vehicle. The motor generator 80 is controlled by an electronic control unit (ECU; not shown). The ECU controls the apparatuses and devices mounted in the vehicle 1 based on information from sensors mounted in the vehicle, to thereby totally control the vehicle 1. A detailed structure of the motor generator 80 will be explained below.

As shown in FIG. 1, the power transmitting device 10 has a housing unit 20, a main shaft 30, a drum 60, a clutch 70, the motor generator 80 and so on.

The housing unit 20 is composed of a stator housing 21 and an MG housing 22.

The stator housing 21 has a housing main body 23, a rear housing 24, and a front housing 25. The housing main body 23 is made of metal and formed in a cylindrical shape.

The rear housing 24 is integrally formed with the housing main body 23 so as to close one axial end thereof (a right-hand end in the drawing). An opening portion 241 is formed in a center of the rear housing 24.

The front housing 25 has a housing plate portion 251 and a first housing cylindrical portion 252. The housing plate portion 251 is made of metal and formed in a plate shape. The housing plate portion 251 is provided so as to close the other axial end of the housing main body 23 (a left-hand end in the drawing). The housing plate portion 251 is fixed to the housing main body 23 by bolts 26. An opening portion 253 is formed in a center of the housing plate portion 251. The first housing cylindrical portion 252 is formed in a cylindrical shape extending from an inner periphery of the opening portion 253 toward the rear housing 24.

The MG housing 22 has an MG housing main body 27 and an MG rear housing 28. The MG housing main body 27 is made of metal and formed in a cylindrical shape. The MG rear housing 28 is integrally formed with the MG housing main body 27 so as to close one axial end thereof (the right-hand end in the drawing).

The stator housing 21 is accommodated in an inside of the MG housing 22 in such a manner that an outer wall of the housing main body 23 is inserted into an inner wall of the MG housing main body 27 and the rear housing 24 is in contact with the MG rear housing 28. An outer peripheral portion of the front housing 25 of the stator housing 21 is fixed by bolts 29 to the MG housing main body 27 of the MG housing 22 at the other axial end of the MG housing main body 27 (the left-hand end in the drawing), which is on an opposite side to the MG rear housing 28. The bolts 26 extend in the axial direction through the housing main body 23 of the stator housing 21 and are screwed into the MG rear housing 28 of the MG housing 22.

An opening portion 281 is formed in a center of the MG rear housing 28 of the MG housing 22, wherein an inner diameter of the opening portion 281 is larger than that of the opening portion 241 of the rear housing 24. A water jacket 271 is formed in the MG housing main body 27 of the MG housing 22, wherein fluid (such as, water) flows through the water jacket 271.

One axial side of the housing unit 20 (on a side of the MG rear housing 28; that is a right-hand side in the drawing) is connected to a transmission housing 13 of the transmission apparatus 3, while the other axial side of the housing unit 20 (on an opposite side of the MG rear housing 28; that is a left-hand side in the drawing) is connected to an engine housing 11, so that the power transmitting device 10 is arranged between the engine 2 and the transmission apparatus 3.

The housing main body 23 of the stator housing 21 and the MG housing main body 27 of the MG housing 22 are collectively referred to as "a housing body", the rear housing 24 of the stator housing 21 and the MG rear housing 28 of the MG housing 22 are collectively referred to as "a rear housing portion". The front housing 25 of the stator housing 21 is also referred to as "a front housing portion".

In addition, the opening portion 241 of the rear housing 24 is also referred to as "a first opening portion", while the opening portion 253 of the front housing 25 is also referred to as "a second opening portion".

The main shaft 30 has a shaft portion 31, a large-diameter portion 32, a shaft cylindrical portion 33, a projecting portion 34, an input shaft 35, a stator shaft 36 and so on.

The shaft portion 31 is made of metal and formed in a cylindrical shape. The shaft portion 31 is inserted into the opening 241 (the first opening portion) of the rear housing 24 of the stator housing 21. A bearing member 242 is provided in the opening portion 241. The bearing member 242 is a needle bearing for movably supporting the shaft portion 31. Namely, the shaft portion 31 is rotatably supported by the rear housing 24 via the bearing member 242. An axial end of the shaft portion 31 (on a side to the transmission apparatus 3; that is, on the right-hand side in the drawing) is connected to an input axis 14 of the transmission apparatus 3.

The large-diameter portion 32 is formed at the other axial end of the main shaft 30, that is, at a side opposite to the transmission apparatus 3 (the left-hand side in the drawing). An outer diameter of the large-diameter portion 32 is made larger than that of the shaft portion 31. The large-diameter portion 32 is arranged between the rear housing 24 of the stator housing 21 and the front housing 25, in other words, in an inside of the stator housing 21.

The shaft cylindrical portion 33 is formed in a cylindrical shape extending from an outer periphery of the large-diameter portion 32 in a direction opposite to the shaft portion 31 (in a left-hand direction).

The projecting portion 34 is composed of a first projection 41 and a second projection 42. The first projection 41 is formed in a cylindrical shape in an inside of the shaft cylindrical portion 33 and projected from a center of the large-diameter portion 32 in the direction opposite to the shaft portion 31 (in the left-hand direction). The second projection 42 is also formed in a cylindrical shape and projected from the first projection 41 in the direction opposite to the large-diameter portion 32 (in the left-hand direction). An outer diameter of the second projection 42 is made smaller than that of the first projection 41.

In the main shaft 30, the shaft portion 31, the large-diameter portion 32, the shaft cylindrical portion 33, the first projection 41 and the second projection 42 are coaxially arranged among each other. The main shaft 30 has a through-hole 37, which extends through centers of the shaft portion 31, the large-diameter portion 32, the first projection 41 and the second projection 42.

The input shaft 35 is made of metal and formed in a tubular shape. The input shaft 35 is provided in the inside of the through-hole 37. An axial end of the input shaft 35 on a side to the engine 2 (that is, a left-hand end in the drawing) is splined to an inner wall of the through-hole 37 in an inside of the second projection 42. According to such a structure, the input shaft 35 is rotatable together with the second projection 42, the first projection 41, the large-diameter portion 32, the shaft cylindrical portion 33 and the shaft portion 31.

The stator shaft 36 is made of metal and formed in a tubular shape. The stator shaft 36 is provided in the inside of the through-hole 37 but an outer side of the input shaft 35. The axial end of the stator shaft 36 on the side to the transmission apparatus 3 (that is, the right-hand end in the drawing) is connected to the transmission apparatus 3. According to the above structure, the input shaft 35 can be rotated in the inside of the stator shaft 36 relative to the stator shaft 36, even when the stator shaft 36 is not rotated.

A working-oil supply passage 50 is formed in the inside of the input shaft 35.

An outer diameter of the input shaft 35 is smaller than an inner diameter of the stator shaft 36. An annular space 43 is thereby formed between the outer wall of the input shaft 35 and the inner wall of the stator shaft 36. Multiple oil passages 53 are formed in the first projection 41, wherein each of the oil passages 53 extends in a radial outward direction from the inner wall of the through-hole 37 and is opened at an outer wall of the first projection 41. The annular space 43 is communicated to the oil passages 53 to form a cooling-oil supply passage 51.

An outer diameter of the stator shaft 36 is smaller than an inner diameter of the through-hole 37. An annular space 46 is thereby formed between the outer wall of the stator shaft 36 and the inner wall of the through-hole 37. Multiple oil passages 54 are likewise formed in the first projection 41, wherein each of the oil passages 54 extends in a radial outward direction from the inner wall of the through-hole 37 and is opened at the outer wall of the first projection 41. The annular space 46 is communicated to the oil passages 54 to form a cooling-oil discharge passage 52.

An intermediate member 44 is interposed between the input shaft 35 and the stator shaft 36, so that a width of the annular space 43 (that is, a width of the cooling-oil supply passage 51 in the radial direction) formed between the input shaft 35 and the stator shaft 36 can be maintained at a constant value. Although not shown in the drawing, oil passages (extending in an axial direction so as to communicate axial ends to each other) are formed in the intermediate member 44. Therefore, oil flow in the cooling-oil supply passage 51 is not prevented by the intermediate member 44.

In a similar manner to the intermediate member 44, an intermediate member 47 is interposed between the stator shaft 36 and the through-hole 37, so that a width of the annular space 46 (that is, a width of the cooling-oil discharge passage 52 in the radial direction) formed between the stator shaft 36 and the through-hole 37 can be maintained at a constant value. Although not shown in the drawing, oil passages (extending in an axial direction so as to communicate axial ends to each other) are formed in the intermediate member 47. Therefore, oil flow in the cooling-oil discharge passage 52 is not prevented by the intermediate member 47.

An annular seal member 45 is arranged between the outer wall of the input shaft 35 and the inner wall of the through-hole 37, so that the working-oil supply passage 50 and the cooling-oil supply passage 51 are fluid-tightly sealed from each other. The seal member 45 is also referred to as "a third sealing member".

In a similar manner to the seal member 45, an annular seal member 48 is arranged between the outer wall of the stator shaft 36 and the inner wall of the through-hole 37, so that the cooling-oil supply passage 51 and the cooling-oil discharge passage 52 are fluid-tightly sealed from each other. The seal member 48 is also referred to as "a fourth sealing member".

The first housing cylindrical portion 252 of the front housing 25 is arranged in the inside of the shaft cylindrical portion 33 and an axial forward end of the first housing cylindrical portion 252 on the side to the rear housing 24 (that is, a right-hand end in the drawing) is arranged at a position close to the large-diameter portion 32. On the other hand, an axial forward end of the shaft cylindrical portion 33 on a side opposite to the large-diameter portion 32 (that is, a left-hand end in the drawing) is arranged at a position close to the housing plate portion 251 in a radial outer area of the first housing cylindrical portion 252.

A disc-shaped flywheel 90 is fixed to an axial end of an output axis 12 of the engine 2 on a side to the transmission apparatus 3 (that is, a right-hand end of the output axis 12 in the drawing) by bolts 91. The flywheel 90 has a damper, which is not shown in the drawing.

The drum 60 has a drum plate portion 61, a drum cylindrical portion 62 and an inner cylindrical portion 63. The drum plate portion 61 is made of metal and formed in a disc shape. The drum plate portion 61 is fixed to the flywheel 90 by bolts 92. In other words, the drum plate portion 61 is connected to the output axis 12 of the engine 2 via the flywheel 90, so that the drum plate portion 61 is rotated together with the flywheel 90 in accordance with the rotation of the output axis 12. According to the present embodiment, the drum plate portion 61 is arranged in the inside of the opening portion 253 (the second opening portion) of the front housing 25.

The drum cylindrical portion 62 is formed in a cylindrical shape extending from an outer periphery of the drum plate portion 61 in a direction opposite to the engine 2, so that the drum cylindrical portion 62 is arranged in the inside of the shaft cylindrical portion 33. An axial forward end of the drum cylindrical portion 62 on a side opposite to the drum plate portion 61 (that is, a right-hand end in the drawing) is arranged at such a position, which is formed between the first projection 41 and the first housing cylindrical portion 252 and which is close to the large-diameter portion 32.

The inner cylindrical portion 63 is formed in a cylindrical shape extending from a center of the drum plate portion 61 in the direction opposite to the engine 2 (in the right-hand direction in the drawing). Communication passages 64 are formed in the inner cylindrical portion 63 at an axial end thereof on the side to the drum plate portion 61, so that an inside space and an outside space of the inner cylindrical portion 63 are communicated to each other. The second projection 42 of the main shaft 30 is arranged in the inside of the inner cylindrical portion 63. A cylindrical intermediate member 65 is interposed between the second projection 42 and the inner cylindrical portion 63.

According to the present embodiment, a first sealing member 93 is provided between the drum cylindrical portion 62 and the first housing cylindrical portion 252, so that a space between the drum 60 and the front housing 25 is fluid-tightly sealed. In a similar manner to the first sealing member 93, a second sealing member 94 is provided between the first housing cylindrical portion 252 and the shaft cylindrical portion 33, so that a space between the front housing 25 and the shaft cylindrical portion 33 is fluid-tightly sealed.

A first bearing member 95 is arranged between an outer wall of the drum cylindrical portion 62 and an inner wall of the first housing cylindrical portion 252 next to the first sealing member 93 on a side to the transmission apparatus 3 (that is, the right-hand side in the drawing). The first bearing member 95 is, for example, a ball bearing for rotatably supporting the drum cylindrical portion 62. In other words, the drum cylindrical portion 62 is rotatably supported by the front housing 25 via the first bearing member 95.

In a similar manner to the first bearing member 95, a second bearing member 96 is arranged between an outer wall of the first housing cylindrical portion 252 and an inner wall of the shaft cylindrical portion 33 next to the second sealing member 94 on the side to the transmission apparatus 3 (that is, the right-hand side in the drawing). The second bearing member 96 is also, for example, a ball bearing for rotatably supporting the shaft cylindrical portion 33. In other words, the shaft cylindrical portion 33 is rotatably supported by the front housing 25 via the second bearing member 96.

The clutch 70 has a frictional engagement unit 71, a pushing member 72 and so on.

The frictional engagement unit 71 is composed of multiple first friction plates 711 and multiple second friction plates 712. Each of the first friction plates 711 is formed in a ring shape and an outer periphery thereof is fixed to the inner wall of the drum cylindrical portion 62. The multiple first friction plates 711 are arranged at equal intervals from each other. Each of the second friction plates 712 is likewise formed in a ring shape and an inner periphery thereof is fixed to the outer wall of the first projection 41 of the main shaft 30. The multiple second friction plates 712 are also arranged at equal intervals from each other and each one of them is interposed between neighboring first friction plates 711. In other words, the first and second friction plates 711 and 712 are alternately arranged in the axial direction. The frictional engagement unit 71 is arranged at such a position, which is close to an opened end of the oil passage 53 (the cooling-oil supply passage 51) formed in the first projection 41.

The pushing member 72 is formed in an annular disc shape and movably arranged in the axial direction between the drum cylindrical portion 62 and the inner cylindrical portion 63. The pushing member 72 is arranged at a position next to the frictional engagement unit 71 on a side to the engine 2. A working-oil chamber 73 is formed in a space surrounded by the pushing member 72, the drum cylindrical portion 62, the inner cylindrical portion 63 and the drum plate portion 61. Namely, the working-oil chamber 73 is formed at a position next to the pushing member 72 on the side opposite to the frictional engagement unit 71. The working-oil chamber 73 is communicated to the inside space of the inner cylindrical portion 63 via the communication passages 64.

An annular plate member 74 is provided between the frictional engagement unit 71 and an outer periphery of the pushing member 72. An annular retainer 75 is fixed to the outer wall of the inner cylindrical portion 63. A biasing member 76 is provided between the pushing member 72 and the retainer 75. The biasing member 76 is a coil spring for biasing the pushing member 72 in the direction toward the engine side (in the left-hand direction in the drawing).

As above, the clutch 70 is accommodated in a clutch accommodating space 101, which is surrounded by the large-diameter portion 32 of the main shaft 30, the inner wall of the shaft cylindrical portion 33, the front housing 25 and the drum 60. An outside space and an inside space of the clutch accommodating space 101 are fluid-tightly sealed from each other by the first and second sealing members 93 and 94.

The motor generator 80 has a stator 81, a rotor 82 and so on. For example, multiple silicon steel plates are laminated to form a cylindrical shape of the stator 81. An outer wall of the stator 81 is inserted (for example, press inserted) into an inner wall of the housing main body 23, so that the stator 81 is accommodated in and firmly fixed to the stator housing 21. Multiple windings 83 are wound on the stator 81. Each of the windings 83 is wound on each of pole cores, which are projecting in radial inward directions.

In a similar manner to the stator 81, multiple silicon steel plates are laminated to form a cylindrical shape of the rotor 82. An inner wall of the rotor 82 is fitted to outer walls of the large-diameter portion 32 and the shaft cylindrical portion 33 of the main shaft 30, while an outer wall of the rotor 82 faces to an inner wall of the stator 81, so that the rotor 82 is rotatable within and relative to the stator 81.

As above, the motor generator 80 is accommodated in an MG accommodating space 102, which is surrounded by the outer wall of the shaft cylindrical portion 33 of the main shaft 30, the inner wall of the housing main body 23 of the stator housing 21, the front housing 25 and the rear housing 24. The clutch accommodating space 101 and the MG accommodating space 102 are separated by the shaft cylindrical portion 33.

According to the present embodiment, a rotational angle sensor 9 (a resolver) is provided in the rear housing 24 of the stator housing 21, wherein the resolver 9 faces to the large-diameter portion 32 of the main shaft 30. The resolver 9 detects a rotational position of the large-diameter portion 32 and sends information relating to the rotational position thereof to the ECU (not shown). Accordingly, the ECU calculates the rotational position, rotational speed and so on of the main shaft 30 as well as the motor generator 80.

According to the present embodiment, the pump 7 is provided in the inside of the opening portion 281 of the MG housing 22. The pump 7 is driven by the rotation of the shaft portion 31 of the main shaft 30, to thereby pump out the working oil for operating the gear mechanism of the transmission apparatus 3 and/or the clutch 70 and further to pump out the cooling oil for cooling down the frictional engagement unit 71 of the clutch 70.

Pressure and amount of the working oil, which is pumped out from the pump 7 for operating the clutch 70, are controlled by a control valve (not shown) and supplied to the working-oil chamber 73 via the working-oil supply passage 50 and the communication passages 64. When the working oil is supplied into the working-oil chamber 73, the pressure of the working oil therein is increased. Then, the pushing member 72 is moved in the direction to the transmission apparatus 3 (in the right-hand direction in the drawing) against the biasing force of the biasing member 76. The outer peripheral portion of the pushing member 72 is pushed to the second friction plate 712 (which is located at a leftmost position on the side to the engine 2) together with the plate member 74.

When the oil pressure in the working-oil chamber 73 is further increased, the pushing member 72 is further moved in the direction to the transmission apparatus 3 (in the right-hand direction in the drawing). As a result, the multiple second friction plates 712 connected to the outer wall of the first projection 41 of the main shaft 30 will be engaged with the multiple first friction plates 711 connected to the inner wall of the drum cylindrical portion 62. Then, the output axis 12 of the engine 2 is coupled to the main shaft 30 via the clutch 70.

As above, the clutch 70 has the frictional engagement unit 71 and the output axis 12 can be coupled to the main shaft 30 by the engagement of the frictional engagement unit 71. The driving force of the engine 2 (which is outputted at the output axis 12) can be transmitted to the transmission apparatus 3 via the main shaft 30.

Pressure and amount of the cooling oil, which is pumped out from the pump 7 for cooling down the clutch 70, are controlled by a control valve (not shown) and supplied to the clutch accommodating space 101 via the cooling-oil supply passage 51. Therefore, the clutch accommodating space 101 is filled with the cooling oil. The cooling oil, which has cooled down the frictional engagement unit 71 in the clutch accommodating space 101, is discharged to the outside of the power transmitting device 10 via the cooling-oil discharge passage 52. As above, according to the present embodiment, the cooling oil is circulated around the frictional engagement unit 71 via the cooling-oil supply passage 51 and the cooling-oil discharge passage 52, so that the frictional engagement unit 71 can be effectively cooled down.

The inside space and the outside space of the clutch accommodating space 101 are fluid-tightly sealed from each other by the first and second sealing members 93 and 94. It is, therefore, possible to prevent or suppress that the working oil and/or the cooling oil may be leaked to the outside of the clutch accommodating space 101, when the clutch 70 is operated by the working oil or when the clutch 70 is cooled down by the cooling oil.

An operation of the power transmitting device 10 will be explained with reference to FIGS. 1 and 2.

When the engine 2 is operated, the output axis 12 is rotated. Then, the flywheel 90 connected to the output axis 12 and the drum 60 connected to the flywheel 90 are rotated. When the clutch 70 does not connect the output axis 12 to the main shaft 30, the driving force, of engine 2 is not transmitted to the main shaft 30.

When the working oil is supplied from the pump 7 into the working-oil chamber 73 via the control valve, the working-oil supply passage 50 and the communication passages 64, the oil pressure in the working-oil chamber 73 is increased so that the pushing member 72 is pushed against the frictional engagement unit 71. As a result, the multiple first and second friction plates 711 and 712 of the frictional engagement unit 71 are engaged with each other. The output axis 12 is thereby coupled to the main shaft 30, so that the driving force of the engine 2 is transmitted to the input axis 14 of the transmission apparatus 3 via the main shaft 30. The driving force of the engine 2, which has been transmitted to the input axis 14, is further transmitted to the vehicle wheels 6 via the differential gear 4 and the axle 5 so as to move the vehicle 1.

When the motor generator 80 is operated in a condition that the output axis 12 is coupled to the main shaft 30 by the clutch 70, the rotational force of the motor generator 80 is transmitted via the main shaft 30 to the input axis 14 of the transmission apparatus 3 together with the driving force of the engine 2. As above, the rotational force (also referred to as the driving force) of the motor generator 80 can be utilized as the assisting force for driving the vehicle, during the vehicle is running by the driving force of the engine 2.

When the supply of the working oil from the pump 7 to the working-oil chamber 73 is stopped, the oil pressure in the working-oil chamber 73 will be decreased. The pushing member 72 is moved in the direction toward the engine 2 (in the left-hand direction) by the biasing force of the biasing member 76. The multiple first and second friction plates 711 and 712 become out of engagement, so that the coupling between the output axis 12 and the main shaft 30 is released.

When the motor generator 80 is operated in a condition that the output axis 12 is not coupled to the main shaft 30, only the rotational force of the motor generator 80 is transmitted to the input axis 14 of the transmission apparatus 3 via the main shaft 30. Therefore, according to the present embodiment, it is also possible to drive the vehicle 1 only by the rotational force (the driving force) of the motor generator 80.

When a braking operation is carried out by a vehicle driver, a regenerative braking operation is carried out by the ECU. Then, the electric power is generated in the motor generator 80 and generated electric energy is charged into the battery 8.

When the operation for engaging and releasing (dis-engaging) the frictional engagement unit 71 is repeatedly carried out during the operation of the clutch 70, heat is generated in the frictional engagement unit 71. According to the present embodiment, the cooling oil is supplied into the clutch accommodating space 101 depending on the operational condition of the clutch 70 so as to cool down the frictional engagement unit 71. Since the cooling oil is supplied to not only a space close to the frictional engagement unit 71 but also a space close to the second bearing member 96 (that is, a space close to the inside of the rotor 82), the rotor 82 can be also cooled down. The temperature of the rotor 82 may be increased when the heat is transferred from the stator 81 and so on to the rotor 82. However, as explained above, the rotor 82 can be also cooled down according to the present embodiment. In addition, the water jacket 271 is provided in the housing main body 27 at an outer side of the stator 81 in its radial outward direction, so that the stator 81 can be cooled down when cooling water flows through the water jacket 271.

The above explained embodiment has the following advantages:

(A-1) As explained above, the main shaft 30 has the working-oil supply passage 50 communicated to the working-oil chamber 73 as well as the cooling-oil supply passage 51 and the cooling-oil discharge passage 52 communicated to the space inside of the shaft cylindrical portion 33. When the working oil is supplied into the working-oil chamber 73 via the working-oil supply passage 50, the oil pressure in the working-oil chamber 73 is increased so that the pushing member 72 is pushed against the frictional engagement unit 71. The first and second friction plates 711 and 712 of the frictional engagement unit 71 are thereby engaged with each other, so that the output axis 12 of the engine 2 is coupled to the input axis 14 of the transmission apparatus 3. When the coupling and de-coupling between the output axis 12 of the engine 2 and the input axis 14 of the transmission apparatus 3 are repeatedly carried out, the engagement and release of the engagement (dis-engagement) are repeatedly carried out in the frictional engagement unit 71. Accordingly, the heat is generated in the frictional engagement unit 71 when the friction plates 711 and 712 are engaged with each other.

According to the present embodiment, however, since the cooling oil is supplied into the inside space of the shaft cylindrical portion 33 via the cooling-oil supply passage 51, the frictional engagement unit 71 of the clutch 70 can be cooled down. The cooling oil having cooled down the frictional engagement unit 71 is discharged to the outside of the power transmitting device 10 via the cooling-oil discharge passage 52. According to the present embodiment, since the cooling oil is circulated around the frictional engagement unit 71 via the cooling-oil supply passage 51 and the cooling-oil discharge passage 52, the frictional engagement unit 71 can be effectively cooled down. Furthermore, it is possible to effectively reduce heat loss in the frictional engagement unit 71.

(A-2) The clutch 70 is accommodated in the clutch accommodating space 101, which is surrounded by the large-diameter portion 32 of the main shaft 30, the inner wall of the shaft cylindrical portion 33, the front housing 25 and the drum 60. On the other hand, the motor generator 80 is accommodated in the MG accommodating space 102, which is surrounded by the outer wall of the shaft cylindrical portion 33 of the main shaft 30, the inner wall of the housing main body 23, the front housing 25 and the rear housing 24. The clutch accommodating space 101 is arranged in the inside of the MG accommodating space 102, and the clutch accommodating space 101 and the MG accommodating space 102 are separated by the shaft cylindrical portion 33.

The space between the drum 60 and the front housing 25 and the space between the front housing 25 and the shaft cylindrical portion 33 are respectively sealed fluid-tightly from the outside of the power transmitting device 10. In other words, the clutch accommodating space 101 is fluid-tightly sealed from the outside of the power transmitting device 10. It is, therefore, possible to prevent and/or suppress that the working oil or the cooling oil may be leaked out from the clutch accommodating space 101.

It is, therefore, possible to avoid the following situations: (a) the working oil or the cooling oil may be leaked out from the clutch accommodating space 101 and such leaked oil may be adhered to the engine 2, or the leaked oil may flow into the MG accommodating space 102;
(b) the working oil or the cooling oil for the clutch 70 may be adhered to the motor generator 80, and thereby the motor generator 80 may be disfeatured; and
(c) extraneous material may come into the working oil or the cooling oil, and the motor generator 80 may become out of order as a result that the working oil or the cooling oil having the extraneous material flows into a gap between the stator 81 and the rotor 82.

As above, the clutch accommodating space 101 is formed by the drum 60, the front housing 25 and the main shaft 30, which are parts and components corresponding to those parts and components of the power transmitting device of the prior art. In addition, the outside and inside of the clutch accommodating space 101 are fluid-tightly sealed from each other, so as to prevent or suppress the defacement of the motor generator 80. In other words, according to the present embodiment, the defacement of the motor generator 80 can be avoided without increasing the number of the parts and components for the clutch accommodating space 101.

(A-3) The rotor 82 of the motor generator 80 is fitted to the outer wall of the shaft cylindrical portion 33. The axial forward end (that is, the right-hand end) of the drum cylindrical portion 62 on the side opposite to the drum plate portion 61 is arranged in the inside of the shaft cylindrical portion 33. The frictional engagement unit 71 of the clutch 70 is provided in the inside of the shaft cylindrical portion 33, so that the frictional engagement unit 71 is connected to the drum cylindrical portion 62 and the main shaft 30. In other words, at least a portion of the clutch 70 in the axial direction is arranged in the inside of the rotor 82. According to such a structure, a part of the clutch 70 and a part of the motor generator 80 are overlapped in the axial direction, so that the power transmitting device 10 can be reduced in its size.

(A-4) The front housing 25 has the first housing cylindrical portion 252, which is formed in the cylindrical shape and extends from the inner periphery of the second opening portion 253 in the direction opposite to the engine 2 (in the right-hand direction), so that the axial forward end (the right-hand end) of the first housing cylindrical portion 252 is arranged in the inside of the shaft cylindrical portion 33.

In addition, the first and second sealing members 93 and 94 are provided. The first sealing member 93 is provided between the drum cylindrical portion 62 and first housing cylindrical portion 252 so as to fluid-tightly seal the gap between the drum 60 and the front housing 25. The second sealing member 94 is provided between the first housing cylindrical portion 252 and the shaft cylindrical portion 33 so as to fluid-tightly seal the gap between the front housing 25 and the shaft cylindrical portion 33. According to the above structure, the inside and the outside of the clutch accommodating space 101 are fluid-tightly sealed from each other by the first and second sealing members 93 and 94.

(A-5) In addition, the first and the second bearing members 95 and 96 are provided. The first bearing member 95 is provided between the outer wall of the drum cylindrical portion 62 and the inner wall of the first housing cylindrical portion 252 for rotatably supporting the drum 60. The second bearing member 96 is provided between the outer wall of the first housing cylindrical portion 252 and the inner wall of the shaft cylindrical portion 33 for rotatably supporting the main shaft 30.

The main shaft 30 is rotatably supported at two portions, one of which is the second bearing member 96 and the other of which is the rear housing 24, so that the load of the bearing portions can be dispersed. The shaft cylindrical portion 33 is rotatably supported by the first housing cylindrical portion 252 of the front housing 25 via the second bearing member 96. Accordingly, it is possible to suppress a swing of the shaft cylindrical portion 33, when the main shaft 30 is rotated. A gap between the outer peripheral surface of the rotor 82, which is fitted to the outer wall of the shaft cylindrical portion 33, and the inner peripheral surface of the stator 81 can be maintained at a constant value, to thereby suppress a decrease of the efficiency of the motor generator 80 (for example, the power generating efficiency).

The drum 62 is rotatably supported by the first housing cylindrical portion 252 of the front housing 25 via the first bearing member 95, so that a swing of the drum cylindrical portion 62 can be suppressed when the drum 60 (the output axis 12 of the engine 2) is rotated.

(A-6) The main shaft 30 has the projecting portion 34 in the inside of the shaft cylindrical portion 33, wherein the projecting portion 34 is projected from the center of the large-diameter portion 32 in the direction opposite to the shaft portion 31. The frictional engagement unit 71 is connected to the inner wall of the drum cylindrical portion 62 and to the outer wall of the projecting portion 34 of the main shaft 30. The pushing member 72 is provided between the frictional engagement unit 71 and the drum plate portion 61. The working-oil chamber 73 is formed between the pushing member 72 and the drum plate portion 61. The cooling-oil supply passage 51 and the cooling-oil discharge passage 52 are communicated to the space, which is formed by the inner wall of the shaft cylindrical portion 33 and the outer wall of the projecting portion 34. Since the cooling-oil passage 51 is opened to the space at the position close to the frictional engagement unit 71, the cooling effect of the cooling oil for the frictional engagement unit 71 can be increased.

(A-7) The main shaft 30 has the shaft portion 31, the through-hole 37 extending through the centers of the large-diameter portion 32 and the projecting portion 34, the tubular input shaft 35 provided in the inside of the through-hole 37 (the outer wall of the axial end of the input shaft 35 on the side to the engine 2 is inserted into the inner wall of the through-hole 37), and the tubular stator shaft 36 provided between the through-hole 37 and the input shaft 35 (the axial end of the stator shaft 36, that is, the right-hand end thereof, is connected to the transmission apparatus 3). The working-oil supply passage 50 is formed in the inside of the input shaft 35. The cooling-oil supply passage 51 is formed between the input shaft 35 and the stator shaft 36. The cooling-oil discharge passage 52 is formed between the stator shaft 36 and the through-hole 37.

The seal member 45 (the third sealing member) and the seal member 48 (the fourth sealing member) are further provided. The third sealing member 45 is provided between the outer wall of the input shaft 35 and the inner wall of the through-hole 37, so as to fluid-tightly seal the working-oil supply passage 50 and the cooling-oil supply passage 51 from each other. The fourth sealing member 48 is provided between the outer wall of the stator shaft 36 and the inner wall of the through-hole 37, so as to fluid-tightly seal the cooling-oil supply passage 51 and the cooling-oil discharge passage 52 from each other.

The third sealing member 45 prevents (or suppresses) that the working oil in the working-oil supply passage 50 may leak out to the cooling-oil supply passage 51 via the space between the outer wall of the input shaft 35 and the inner wall of the through-hole 37. As a result, it is possible to avoid such a situation that a response of the clutch 70 may be decreased. In addition, the fourth sealing member 48 prevents (or suppresses) that the cooling oil before the cooling the frictional engagement unit 71 may leak out from the cooling-oil supply passage 51 to the cooling-oil discharge passage 52 between the outer wall of the stator shaft 36 and the inner wall of the through-hole 37 or the cooling oil after having cooled down the frictional engagement unit 71 may leak out from the passage 52 to the passage 51. As a result, it is possible to avoid such a situation that the cooling effect for the frictional engagement unit 71 may be decreased.

Second Embodiment

A power transmitting device according to a second embodiment is shown in FIG. 3. According to the second embodiment, the shape of the front housing as well as the location of the second bearing member is different from the first embodiment.

According to the second embodiment, the front housing 25 has a second housing cylindrical portion 254, which is formed in a cylindrical shape and provided at an outer side of the first housing cylindrical portion 252 and which extends from the housing plate portion 251 in the direction opposite to the engine (in the right-hand direction in the drawing), so that an axial forward end of the second cylindrical portion 254 is arranged at a position which is outside of the shaft cylindrical portion 33.

As in the same manner to the first embodiment, the first bearing member 95 is provided between the outer wall of the drum cylindrical portion 62 and the inner wall of the first housing cylindrical portion 252, so as to rotatably support the drum 60. The second bearing member 96 is provided between the outer wall of the shaft cylindrical portion 33 and an inner wall of the second housing cylindrical portion 254, so as to rotatably support the main shaft 30.

According to the present embodiment, as in the same manner to the first embodiment, the main shaft 30 is rotatably supported at two portions, one of which is the second bearing member 96 and the other of which is the rear housing 24, so that the load of the bearing portions can be dispersed. The shaft cylindrical portion 33 is rotatably supported by the second housing cylindrical portion 254 of the front housing 25 via the second bearing member 96. Therefore, it is possible to suppress the swing of the shaft cylindrical portion 33, when the main shaft 30 is rotated. And the gap between the outer peripheral surface of the rotor 82, which is fitted to the outer wall of the shaft cylindrical portion 33, and the inner peripheral surface of the stator 81 can be maintained at the constant value, to thereby suppress the possible decrease of the efficiency of the motor generator 80 (for example, the power generating efficiency).

According to the first embodiment, the first bearing member 95 is arranged at the inner side of the first housing cylindrical portion 252, while the second bearing member 96 is arranged at the outer side of the first housing cylindrical portion 252. In other words, the first housing cylindrical portion 252 is inserted between the first and the second bearing members 95 and 96. According to such a structure, it may be a disadvantage that an assembling process may not be easily done.

According to the second embodiment, however, the first bearing member 95 is arranged at the inner side of the first housing cylindrical portion 252, while the second bearing member 96 is arranged at the inner side of the second housing cylindrical portion 254. According to such a structure, in which the first and second bearing members 95 and 96 are separately arranged from each other, an assembling process can be easily done.

(Further Modifications)

According to the above embodiments, the first sealing member 93 is provided between the drum cylindrical portion 62 and the first housing cylindrical portion 252. However, the first sealing member 93 may be provided between the drum plate portion 61 and the second opening portion 241 of the front housing 25. According to such a modification, it may be possible to remove the first housing cylindrical portion 252 from the front housing 25.

According to the above embodiments, the second sealing member 94 is provided between the first housing cylindrical portion 252 of the front housing 25 and the shaft cylindrical portion 33 of the main shaft 30. However, the second sealing member 94 may be provided between the housing plate portion 251 of the front housing 25 and an axial end of the shaft cylindrical portion 33 on the side to the front housing 25 (that is, a left-hand end of the shaft cylindrical portion 33). According to such a modification, it may be possible to remove the first housing cylindrical portion 252 from the front housing 25.

According to a further modification, the first and second bearing members 95 and 96 may be eliminated. This is because the drum 60 is supported by the output axis 12 of the engine 2, while the main shaft 30 is supported by the rear housing 24 via the bearing member 242.

The frictional engagement unit 71 of the clutch 70 may be arranged in any other position of the clutch accommodating space 101, so long as the frictional engagement unit 71 can be connected to the drum cylindrical portion 62 and the main shaft 30. In other words, the projecting portion 34 may not be formed in the main shaft 30.

According to the above embodiments, the input shaft 35 and the stator shaft 36 are provided in the through-hole 37 of the main shaft 30, so as to form the working-oil supply passage 50 in the inside of the input shaft 35, to form the cooling-oil supply passage 51 between the input shaft 35 and the stator shaft 36, and to form the cooling-oil discharge passage 52 between the stator shaft 36 and the through-hole 37. However, as an alternative structure, the cooling-oil discharge passage may be formed between the input shaft 35 and the stator shaft 36, while the cooling-oil supply passage may be formed between the stator shaft 36 and the through-hole 37. As a further alternative structure, multiple holes are simply formed in the main shaft to respectively form the working-oil supply passage, the cooling-oil supply passage and the cooling-oil discharge passage, instead of using the input shaft 35 and the stator shaft 36.

The third and fourth sealing members 45 and 48 may not be always necessary.

The frictional engagement unit 71 is composed of the multiple first and second friction plates 711 and 712. According to a further modification, the frictional engagement unit may be composed of one first and one second friction plate.

The biasing member 76, which biases the pushing member 72 in the direction opposite to the frictional engagement unit 71, may not be always necessary.

The clutch 70 may be operated by working oil, which is supplied from a pump different from the pump 7 for supplying the working oil for the transmission apparatus 3.

The power transmitting device of the present disclosure may be applied to the vehicle having a transmission apparatus (for example, an automatic transmission apparatus) other than the CVT.

As above, the present disclosure should not be limited to the above explained embodiments, but may be modified in various manners without departing from the spirit of the present disclosure.

What is claimed is:

1. A power transmitting device for transmitting driving force of an engine to a transmission apparatus of a vehicle comprising:
 a housing having; a cylindrical housing main body; a rear housing having a first opening portion at a center thereof and closing a first axial end of the housing main body on a transmission side; and a front housing having a second opening portion at a center thereof and closing a second axial end of the housing main body on an engine side;
 a main shaft having; a shaft portion, which is to be connected to an input axis of the transmission apparatus, inserted through the first opening portion and rotatably supported by the rear housing; a large-diameter portion having a larger diameter than that of the shaft portion and formed at an axial end of the shaft portion on a side opposite to the transmission apparatus; and a shaft cylindrical portion formed in a cylindrical shape and extending from an outer periphery of the large-diameter portion in a direction opposite to the shaft portion;
 a drum having; a drum plate portion formed in an inside of the second opening portion and to be connected to an output axis of the engine; and a drum cylindrical portion formed in a cylindrical shape and extending from an outer periphery of the drum plate portion in a direction opposite to the engine, wherein an axial forward end of the drum cylindrical portion is arranged in an inside of the shaft cylindrical portion;
 a clutch having; a frictional engagement unit having a first and a second friction plate and respectively connected to the drum cylindrical portion and to the main shaft; a pushing member for bringing the frictional engagement unit into a clutch-engaged condition when the pushing member is pushed toward the frictional engagement unit; and a working-oil chamber formed at an axial end of the pushing member on a side opposite to the frictional engagement unit, wherein the output axis is coupled to the input axis when the first and second friction plates are engaged with each other; and
 a motor generator having; a stator of an annular shape, an outer wall of which is fixed to an inner wall of the housing; and a rotor of an annular shape, an inner wall of which is firmly fitted to outer walls of the large-diameter portion and the shaft cylindrical portion, so that the rotor is rotatable in an inside of the stator relative to the stator,
 wherein the main shaft has; a working-oil supply passage communicated to the working-oil chamber; and a cooling-oil supply passage and a cooling-oil discharge passage, both of which are communicated to a space formed in the inside of the shaft cylindrical portion, and
 wherein a gap between the drum and the front housing as well as a gap between the front housing and the shaft cylindrical portion is fluid-tightly sealed.

2. The power transmitting device according to the claim 1, wherein the front housing has a first housing cylindrical portion, which is formed in a cylindrical shape and extending from an inner periphery of the second opening portion in a direction opposite to the engine, so that an axial forward end of the first housing cylindrical portion is arranged in the inside of the shaft cylindrical portion, and
 wherein the power transmitting device further comprising;
 a first sealing member provided between the drum plate portion and the second opening portion or between the drum cylindrical portion and the first housing cylindrical portion for fluid-tightly sealing the gap between the drum and the front housing; and
 a second sealing member provided between the first housing cylindrical portion and the shaft cylindrical portion for fluid-tightly sealing the gap between the first housing cylindrical portion and the shaft cylindrical portion.

3. The power transmitting device according to the claim 2, further comprising;
 a first bearing member provided between an outer wall of the drum cylindrical portion and an inner wall of the first housing cylindrical portion for rotatably supporting the drum; and
 a second bearing member provided between an outer wall of the first housing cylindrical portion and an inner wall of the shaft cylindrical portion for rotatably supporting the main shaft.

4. The power transmitting device according to the claim 2, wherein the front housing has a second housing cylindrical portion, which is formed in a cylindrical shape at an outer side of the first housing cylindrical portion and extending in the direction opposite to the engine, so that an axial forward end of the second housing cylindrical portion is arranged in the outside of the shaft cylindrical portion, and
 wherein the power transmitting device further comprising;
 a first bearing member provided between an outer wall of the drum cylindrical portion and an inner wall of the first housing cylindrical portion for rotatably supporting the drum; and
 a second bearing member provided between an outer wall of the shaft cylindrical portion and an inner wall of the second housing cylindrical portion for rotatably supporting the main shaft.

5. The power transmitting device according to the claim 1, wherein the main shaft has a projecting portion, which is formed in an inside of the shaft cylindrical portion and projecting from a center of the large-diameter portion in a direction opposite to the shaft portion, the frictional engagement unit is connected to the inner wall of the drum cylindrical portion and an outer wall of the projecting portion, the pushing member is, provided between the frictional engagement unit and the drum plate portion, the working-oil chamber is formed between the pushing member and the drum plate portion, and the cooling-oil supply passage and the cooling-oil discharge passage are respectively communicated to the space, which is formed between the inner wall of the shaft cylindrical portion and the outer wall of the projecting portion.

6. The power transmitting device according to the claim 5, wherein the main shaft has; a through-hole extending through respective centers of the shaft portion, the large-diameter portion and the projecting portion; a tubular input shaft provided in the inside of the through-hole, wherein an outer wall of an axial end of the input shaft on a side to the engine is inserted into an inner wall of the through-hole; and a tubular stator shaft provided between the input shaft and the through-hole, wherein an axial end of the stator shaft is to be connected to the transmission apparatus, the working-oil supply passage is formed in the inside of the input shaft, the cooling-oil supply passage is formed in one of spaces between the input shaft and the stator shaft and between the stator shaft and the through-hole, and the cooling-oil discharge passage is formed in the other one of the spaces between the input shaft and the stator shaft and between the stator shaft and the through-hole.

7. The power transmitting device according to the claim 6, further comprising;

a third sealing member provided between the outer wall of the input shaft and the inner wall of the through-hole for fluid-tightly sealing the working-oil supply passage and the cooling-oil supply passage from each other, or sealing the working-oil supply passage and the cooling-oil discharge passage from each other; and a fourth sealing member provided between the outer wall of the stator shaft and the inner wall of the through-hole for fluid-tightly sealing the cooling-oil supply passage and the cooling-oil discharge passage from each other.

\* \* \* \* \*